(12) United States Patent
Anderson

(10) Patent No.: US 8,061,687 B2
(45) Date of Patent: Nov. 22, 2011

(54) PLUG VALVE

(76) Inventor: Richard James Robert Anderson, Ryton (GB)

( * ) Notice: Subject to any disclaimer, the term of this patent is extended or adjusted under 35 U.S.C. 154(b) by 197 days.

(21) Appl. No.: 12/312,310

(22) PCT Filed: Aug. 7, 2008

(86) PCT No.: PCT/GB2008/050672
§ 371 (c)(1),
(2), (4) Date: May 5, 2009

(87) PCT Pub. No.: WO2009/071923
PCT Pub. Date: Jun. 11, 2009

(65) Prior Publication Data
US 2011/0037008 A1 Feb. 17, 2011

(30) Foreign Application Priority Data
Dec. 7, 2007 (GB) .................................. 0723948.6

(51) Int. Cl.
*F16K 5/00* (2006.01)
(52) U.S. Cl. .................... 251/312; 251/309; 251/317
(58) Field of Classification Search .............. 251/309, 251/312, 314, 316, 317
See application file for complete search history.

(56) References Cited

U.S. PATENT DOCUMENTS

| 2,986,374 | A | | 5/1961 | Rakus | |
|---|---|---|---|---|---|
| 3,133,722 | A | * | 5/1964 | Mcguire et al. | 251/309 |
| 3,199,835 | A | * | 8/1965 | Freed | 251/309 |
| 3,425,661 | A | | 2/1969 | Mayo | |
| 3,442,490 | A | * | 5/1969 | Smith | 251/317 |
| 3,521,856 | A | * | 7/1970 | Smith | 251/172 |
| 3,971,402 | A | | 7/1976 | Gallo | |
| 4,215,847 | A | | 8/1980 | Hoos | |
| 6,640,823 | B2 | * | 11/2003 | Gonsior | 137/15.18 |
| 6,655,658 | B2 | | 12/2003 | Neal et al. | |
| 2002/0179876 | A1 | | 12/2002 | Pang | |

FOREIGN PATENT DOCUMENTS
CH 529955 12/1972
GB 2298024 8/1996
* cited by examiner

*Primary Examiner* — John Fristoe, Jr.

(57) ABSTRACT

A plug valve assembly having an inlet and an outlet comprises a housing including a bore extending through the housing between the inlet and the outlet and a cavity intersecting the bore, a plug mounted in the cavity for rotation between first and second positions. In the first position an orifice extending through the plug is aligned axially with the bore of housing to allow fluid to flow from the inlet to the outlet and in the second position fluid is prevented from flowing from the inlet to the outlet. Seals are located in the cavity between the plug and an inner surface of said cavity and a plug retaining member is releasably attachable to the housing. A surface of the plug retaining member limits upward movement of the plug in the housing. The housing includes a reinforcement collar extending around the inner surface of the cavity.

11 Claims, 3 Drawing Sheets

PLUG VALVE

FIELD OF THE INVENTION

The present invention relates to plug valves, and in particular to a plug valve having a safe operating pressure of up to 15000 psi depending on the fluid passing through the valve.

BACKGROUND OF THE INVENTION

Plug valves are typically used in the oil industry for the purpose of controlling flow. Plug valves are required to operate under different conditions of pressure. Typically, the greater the safe operating pressure, the heavier is the construction of the plug valve. For example, a plug valve made of cast or forged steel for example, for operation up to 6000 psi would typically weigh less than 25 kgs, whereas a plug valve made from the same material for operation at pressures up to 10000 psi would typically weigh between 40 and 50 kgs.

A number of countries have either recently introduced, or intend to introduce legislation relating to health and safety in the work place which prescribes a limit on the weight of an object that a person is permitted to lift, this limit varying slightly from country to country, but generally being not more than 25 kgs.

Whilst plug valves weighing more than 25 kgs may be lifted by more than one person, such that each person lifts not more than 25 kgs, this is generally undesirable, as two people are required when otherwise one person would be able to complete the task, and further additional equipment may be required to facilitate two people lifting such an object.

It is therefore desirable that a plug valve should be of such a weight that it may be lifted by a single person.

As mentioned above, some plug valves do weigh less than 25 kgs. Such a plug valve is shown in cross-section in FIG. 1. However, such a plug valve only has a safe operating pressure of up to 6000 psi. There is a need for a plug valve which weighs not more than 25 kgs and is capable of operating at pressures greater than 6000 psi. In particular, there is a need for a plug valve which weighs not more than 25 kgs and is capable of operating at pressures exceeding 6000 psi, for example a plug valve weighing not more than 25 kgs which is capable of operating at pressures in the region of 15000 psi, depending on the fluid being transported through the plug valve.

Other examples of plug valves known in the art are described in the US patent application published under number 2003/0151016 and U.S. Pat. No. 2,986,374.

A plug valve which may be operated by a low turning torque is described in the UK patent application published under U.S. Pat. No. 2,298,024.

The present invention seeks to provide a plug valve of relatively low weight compared to existing plug valves which is capable of operating safely at high pressures.

SUMMARY OF THE INVENTION

According to one aspect of the invention there is provided a plug valve as specified in Claim 1.

According to another aspect of the invention there is provided a method of controlling the flow of fluid in a pipe line as specified in Claim 10.

The plug valve of the invention has a safe operating pressure of 15000 psi, yet does not weigh more than 25 kgs. The ability of the plug valve of the invention to withstand pressures significantly greater than that which the plug valve illustrated in FIG. 1 may withstand is derived from the provision of the ring in the housing forging. In addition to strengthening the housing forging the ring prevents upward movement of the seals.

Where the plug valve is deployed in a pipeline which is used to transport sour crude oil or sour gas, i.e. crude oil and gas containing hydrogen sulphide ($H_2S$) the pressure rating of the whole pipeline is reduced due to the tendency of hydrogen sulphide to induce stress cracking in steel. Hence, a plug valve having a pressure rating of 15000 psi for fluids which are not regarded as capable of producing hydrogen sulphide conditions, might have a pressure rating of only 10000 psi in a pipeline operating in hydrogen sulphide conditions.

BRIEF DESCRIPTION OF THE DRAWINGS

In the drawings, which illustrate plug valves of both the prior art and the present invention, and are by way of example.

DETAILED DESCRIPTION OF THE DRAWINGS

Figure 1:
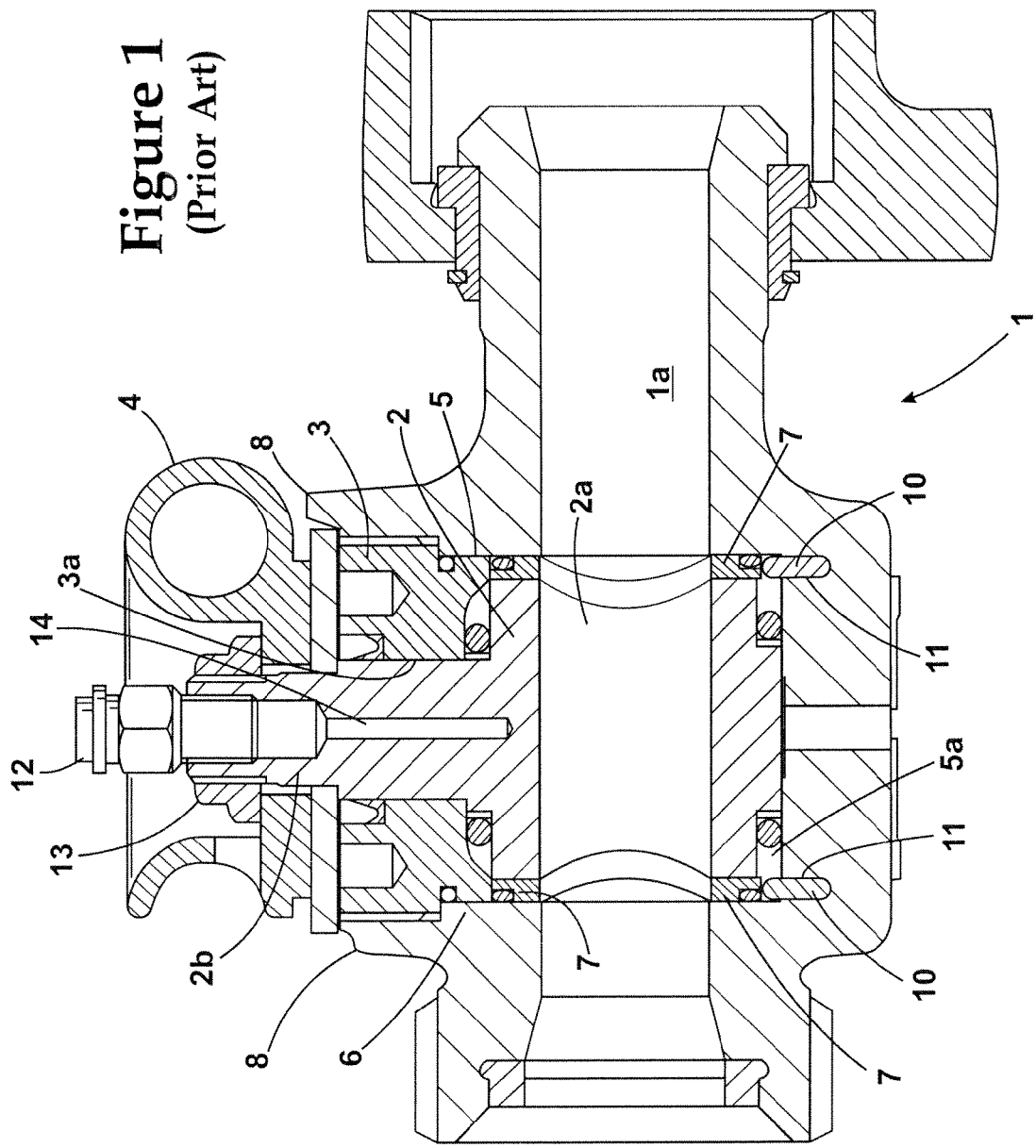
FIG. 1 is a cross-sectional elevation of a plug valve of the prior art having a safe operating pressure of 6000 psi and weight of not more than 25 kgs.

Referring now to FIG. 1, there is shown a plug valve of the prior art having a maximum safe operating pressure of 6000 psi. The plug valve comprises a housing 1 having a through bore 1a, and mounted in the housing a plug 2 having an orifice 2a extending therethrough. The plug 2 includes a shaft 2b which extends through a aperture 3a in a cap 3. The cap 3 is secured to the housing 1 by screw threads and serves to hold the plug 2 and hence seals 7 in place. Using the handle 4, which is removably attachable to the shaft 2b, the plug 2 is turned through 90 degrees to either align axially the bore 1a with the orifice 2; thereby permitting flow of fluid through the valve, or to position the axis of the orifice 2a perpendicular to the bore 1a of the housing, preventing flow of fluid through the valve.

The housing 1 is forged in a closed die from steel, although other materials, such as metal alloys could be used. Further, the housing may be cast rather than forged.

Using the same materials, by increasing the physical size and hence the weight of a plug valve of the configuration shown in FIG. 1, a safe operating pressure greater than 6000 psi can be achieved.

To assemble the plug valve illustrated in FIG. 1 the plug 2, seals 7 associated therewith and the cap 3 are inserted into the cavity 5 of housing 1 as a single unit. The seals 7 are held in place by pins 10 which are located in holes 11 in the housing 1. The holes 11, in the present example, are formed in the housing 1 by drilling, although they may be formed by any suitable method. The components of the plug valve are retained in place in the housing 1 by the screw thread on the cap 3. With the cap 3 in place, the handle 4 is attached to the shaft 2b and held in place by a stop nut 13. The plug valve 1 is lubricated by attaching a grease gun to a grease fitting 12, grease so introduced passing through a bore 14.

Figure 3:
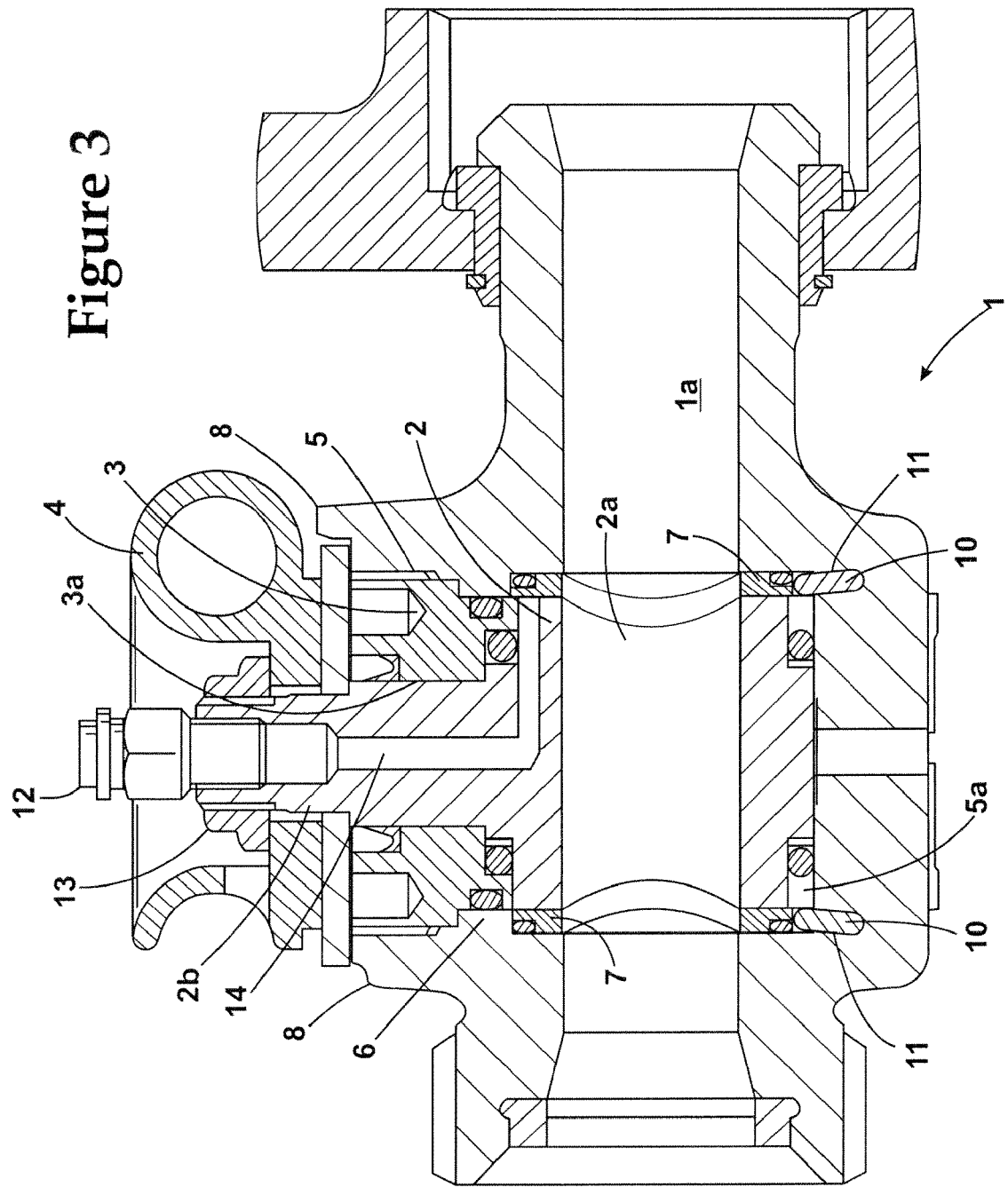
FIG. 3 is a cross-sectional elevation of a plug valve according to the present invention having a safe operating pressure of 15000 psi and a weight of not more than 25 kgs.

Referring now to FIG. 3, the plug valve of the invention is made of the same material as that illustrated in FIG. 1. The plug valve comprises a housing 1 having a through bore 1a, and mounted in the housing a plug 2 also having a through bore 2a. The plug 2 includes a shaft 2b which extends through a aperture 3a in a cap 3. The cap 3 is secured to the housing 1 by screw threads. Using the handle 4, which is removably attachable to the shaft 2b, the plug 2 is turned through 90 degrees to either align axially the bores 1a and 2a or to position the axis of the bore 2a perpendicular to the bore 1a of the housing using the handle 4. The improvement arises from the inclusion of a collar 6 extending around the inner surface of the cavity 5 in which the plug is located.

To assemble the plug valve illustrated in FIG. 3 pins 10 are inserted into holes 11, which are formed in the housing at an angle to the axis of the plug 2 either by drilling or another alternative manufacturing method. The seals 7 are then inserted into the part 5a of the cavity 5 such that the top of each seal 7 sits under the collar 6. The plug 2, the cap 3 are inserted into the cavity 5 of housing 1 and the cap 3 turned to screw it into a position in which it prevents upward movement of the plug 2 in the cavity 5. With the cap 3 in place, the handle 4 is attached to the shaft 2b and held in place by a stop nut 13. The plug valve 1 is lubricated by attaching a grease gun to a grease fitting 12, grease so introduced passing through a bore 14.

The inclusion of the collar 6 provides a number of means of strengthening the housing 1. The collar itself, by virtue of its shape and the increased amount of material in that part of the housing, increases the strength of the housing. By including the collar 6 it is not possible to insert the plug, seals associated therewith, the cap and its associated handle into the housing as a single unit. Instead, the seals 7 must first be placed in the housing, followed by the plug 2 and cap 3. The seals 7 are held in place by the combination of the lower surface of the collar 6 and the outer surface of the plug 2, whereas in the prior art the seals are held in place by a combination of the outer surface of the plug and the lower surface of the cap 3, the plug being held in position by the cap 3 and the screw thread between the cap 3 and the housing 1. Further, the requirement to the amount of material in the region of the housing marked 8 is increased compared to the same region of the housing illustrated in FIG. 1, further strengthening the housing.

Whilst it is known to strengthen the housing of plug valve of the type illustrated in FIG. 1 with an external reinforcement, such an amendment in configuration increases the weight of the whole assembly above that which is acceptable.

Also, it is known to fabricate a plug valve the housing of which includes a lip projecting inwardly of the housing, as exemplified in the patent application published under number GB2298024. However, in this patent application relates to a tapered plug and the seals are held in place by locking members in the form of depressions machined into the inner surface of the cavity in which the plug sits.

The housing of the plug valve of the invention and illustrated in FIG. 3 is formed from forging and uses the same material as used in the plug valve illustrated in FIG. 1. The increased strength of the plug, valve of the invention over that illustrated in FIG. 1 stems from its shape and configuration. The inclusion of the collar, in addition to increasing the strength of the housing removes the need for the retaining member to engage with the upper surfaces of the seals, and therefore the thickness of the housing where the retaining member attaches thereto can be increased again increasing the strength of the housing. Still further, the configuration of the invention provides for the retaining member to contact the plug at two spaced apart locations, those being around the perimeter of the plug and around the perimeter of the shaft extending from the plug, whereas in the prior art the retaining member contacts the plug only around the perimeter of the shaft.

Providing a plug valve with little increase in weight (weighing not more than 25 kgs), yet having double the safe operating pressure capability (up to 15000 psi for the configuration illustrated when transporting a fluid which does not produce hydrogen sulphide conditions) represents a major advance in the field of plug valves.

The invention provides a plug valve which is weight for weight stronger than plug valves of the prior art. Hence the principle of shape and configuration of the invention may be applied to provide a larger bore for the same operating pressure as a plug valve of the prior art. Further, the shape and configuration may be scaled up or down to provide larger and heavier, or smaller and lighter plug valves having commensurately greater or smaller safe operating pressures.

Figure 2:
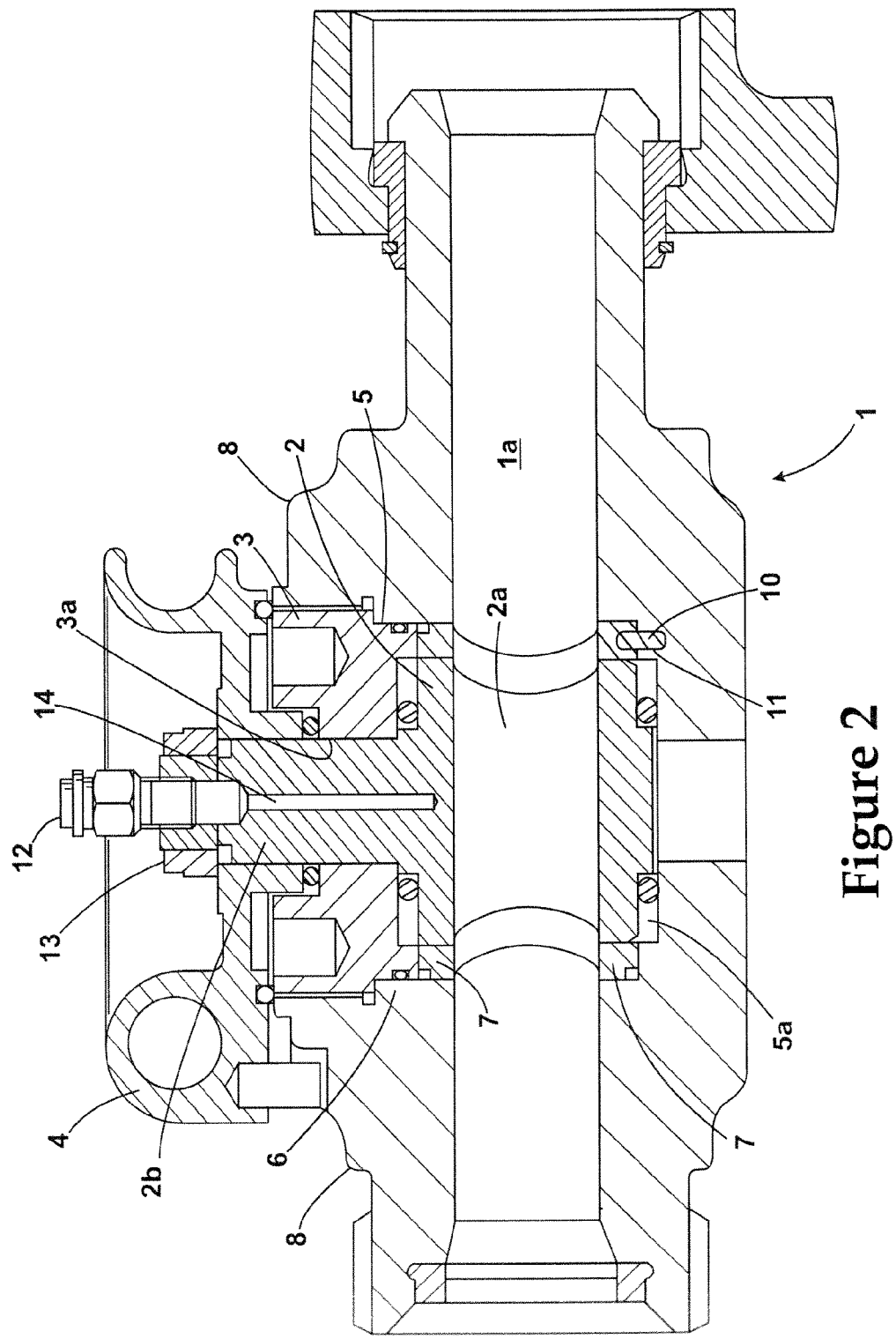
FIG. 2 is a cross-sectional elevation of a plug valve of the prior art having a safe operating pressure of 15000 psi and a weight of 41.5 kgs.

FIG. 2 illustrates another plug valve of the prior art which has a safe operating pressure equal to that provided by the plug valve of the invention. This plug valve weighs 41.5 kgs rather than 25 kgs. One skilled in the art will readily comprehend the relative massive construction of the plug valve of FIG. 2 compared to that of the invention.

The invention claimed is:

1. A plug valve having an inlet and an outlet,
    the valve comprising a housing including a bore extending through the housing between the inlet and the outlet, an upper section and a lower section respectively above and below a longitudinal centre axis of the bore, and a cavity intersecting the bore,
    a plug mounted in the cavity for rotation between first and second positions, wherein in the first position an orifice extending through the plug is aligned axially with said bore of the housing to allow fluid to flow from the inlet to the outlet and in the second position fluid is prevented from flowing from the inlet to the outlet,
    seals located in the cavity between the plug and an inner surface of said cavity and a plug retaining member releasably attachable to the housing, wherein a surface of the plug retaining member limits upward movement of the plug in the housing,
    and wherein the housing includes a reinforcement collar extending around the inner surface of the cavity in the upper section of the housing, said collar projecting inwardly into said cavity and defining an end surface thereon having a diameter less than a diameter of any other part of the inner surface of the cavity, and wherein the seals engage with an underside of the said collar.

2. A plug valve according to claim 1, wherein the retaining member passes through the collar and with the retaining member in its plug retaining configuration the base of retaining member is substantially aligned with the underside of said collar and a surface of the plug.

3. A plug valve according to claim 1, wherein the plug retaining member presents two spaced apart surfaces for engagement with the plug, one being adjacent the perimeter of the plug and the other being adjacent a shaft extending from the plug and passing through an aperture in the retaining means.

4. A plug valve according to claim 1, wherein the external diameter of the retaining member corresponds substantially to the internal diameter of that part of the cavity which receives the plug.

5. A plug valve according to claim 1, wherein the retaining member includes an externally threaded portion, and the cavity of the housing includes an internally threaded portion, the said threads providing the said means of securing the retaining member to the housing.

6. A plug valve according to claim 1, wherein the retaining member includes a portion of reduced diameter.

7. A plug valve according to claim 6, wherein the external diameter of the said portion corresponds substantially to the diameter of said end surface of the collar.

8. A plug valve according to claim 6, wherein the portion of reduced diameter extends from the free end of the retaining member adjacent the plug to a step, and wherein a surface of the step rests upon the upper surface of the collar.

9. A plug valve according to claim 1, wherein the base of each seal is secured in the housing by means of pins located in holes in the housing, the axis of each hole lying at an angle to the axis of rotation of the plug located in the cavity.

10. A plug valve according to claim 1, wherein the retaining member passes through the collar and with the retaining member in its plug retaining configuration the base of retaining member is substantially aligned with the underside of collar with which the seals engage.

11. A plug valve according to claim 1, wherein the inner surface of the cavity is cylindrical and wherein the plug is cylindrical, the axes of the inner surface and the plug being coincident and perpendicular to and intersecting the longitudinal centre axis of the bore.

* * * * *